United States Patent [19]

Mason

[11] 4,381,493
[45] Apr. 26, 1983

[54] VISUAL DISPLAY SYSTEM

[76] Inventor: Robert S. Mason, 7311 Alpine Way, Tujunga, Calif. 91042

[21] Appl. No.: 196,777

[22] Filed: Oct. 14, 1980

[51] Int. Cl.³ .............................................. G06F 3/14
[52] U.S. Cl. ............................. 340/27 R; 340/815.01; 340/717
[58] Field of Search .................. 340/27 R, 25, 366 F, 340/311.1, 706, 717, 332

[56] References Cited

U.S. PATENT DOCUMENTS

| | | | |
|---|---|---|---|
| 2,623,111 | 12/1952 | Chervenka et al. | 340/332 |
| 3,396,378 | 8/1968 | Keith, Jr. | 340/711 |
| 3,701,945 | 10/1972 | Gallant et al. | 340/711 |
| 3,890,614 | 6/1975 | Argentieri et al. | 340/27 R |
| 4,185,281 | 1/1980 | Silverstone | 340/706 |

*Primary Examiner*—Glen R. Swann, III
*Attorney, Agent, or Firm*—John J. Posta, Jr.

[57] ABSTRACT

A visual display system for use by aircraft flight personnel in displaying flight criteria comprises one or more visual display devices including one or more display screens and a manually operable control panel remotely connected thereto and to a power source. The control panel has an off-on power activation switch, a multi-position, multi-characteristic selector knob switch to select characteristics and cause their input to a display device, and one or more multi-position, multi-numeral selector switches for selection of numerical input to a display device. With multiple display units, a selector switch is included to determine which display device receives the input and a holding circuit to cause retention of the visual display in one of the display devices while input is passed to and displayed in another of the display devices. It can also include switches to control the number of zeroes associated with the numerical input and a dimmer switch.

6 Claims, 3 Drawing Figures

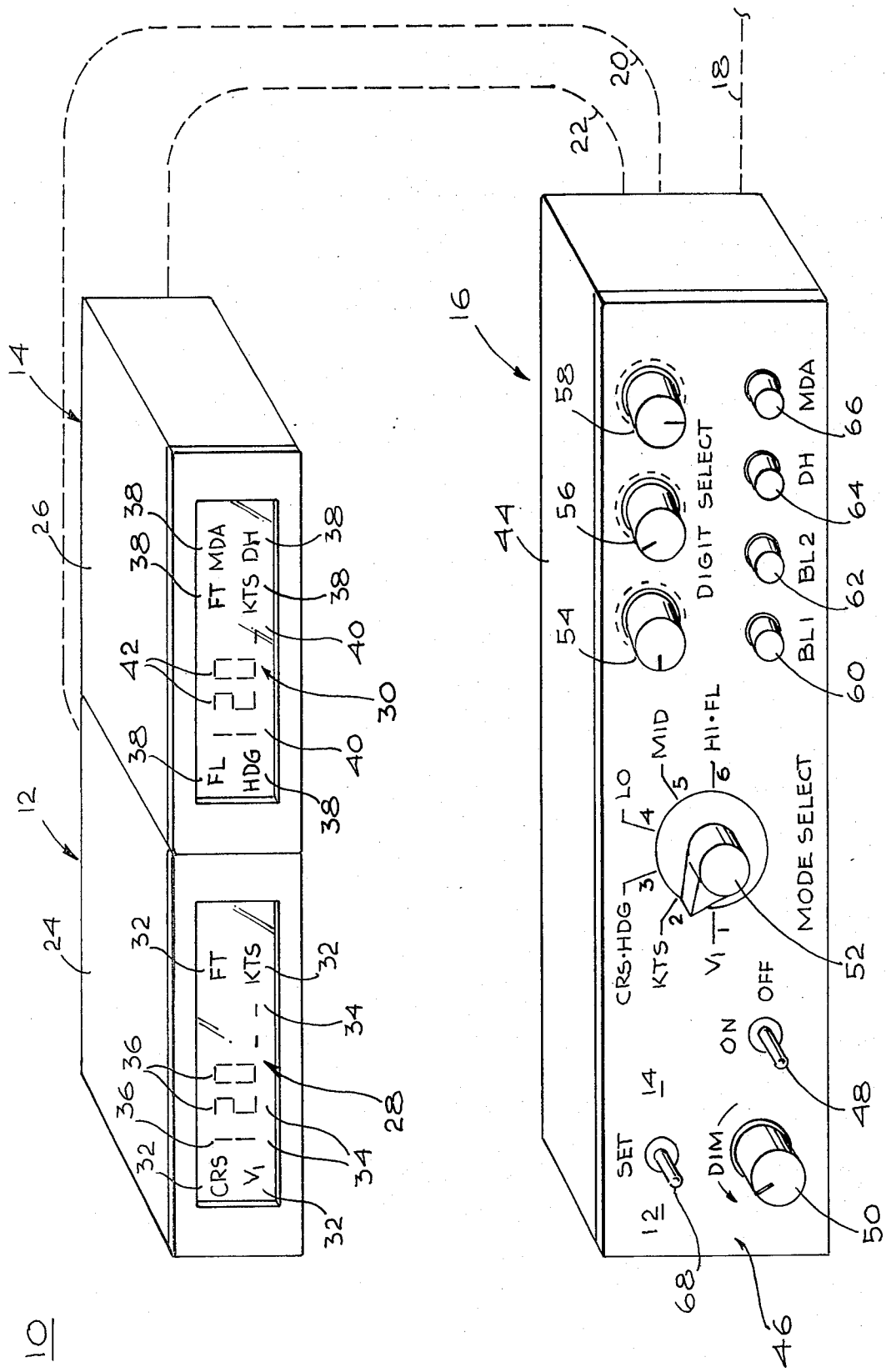

VISUAL DISPLAY SYSTEM

BACKGROUND OF THE INVENTION

1. Field of the Invention

The present invention generally relates to display devices and more particularly to an improved visual display system for use by the pilot and/or other aircraft flight personnel.

2. Prior Art

Various types of equipment have been devised and utilized to assist the pilot and/or co-pilot, engineer, etc. during take-off, flight and landing of commercial and other aircraft. One type of such equipment is directed toward coordinating and controlling a number of aircraft radio communications and navigation instruments from a single digital keyboard installed in the flight cabin. The equipment itself is complicated and expensive. See, for example, U.S. Pat. No. 3,701,945. Another complicated and expensive type is utilized in association with an airborne general purpose navigational computer. See, for example, U.S. Pat. No. 3,396,378. A third type of less complexity, such as is disclosed in U.S. Pat. No. 4,185,281 is concerned with the display in a cockpit of preprogrammed flight data on one of a plurality of display elements. However, such device does not provide for the display of multiple data simultaneously on a plurality of separate display devices. Moreover, it includes a data processor which must be activated to enter the data and ultimately to display it in suitable form, modified or unmodified.

There remains a need for a simple, manually controllable flight data display system for pilots and the like, which system can simultaneously display a plurality of different data in one or more display devices and which data can be directly and immediately modified by the pilot from a simple control panel.

SUMMARY OF THE INVENTION

The foregoing needs have now been satisfied by the improved visual display system of the present invention. The system is substantially as set forth in the Abstract above. It is particularly adapted for use in an aircraft to aid in reminding the pilot and/or copilot of criteria to be met at various stages during take-off, flight and landing of the aircraft. The system includes one or more visual display devices each including a display screen, a control panel and power means connected to the devices through the panel. The panel includes an on-off power switch, a switch to determine which display device is to be fed data for display, a switch-bearing control knob which determines which flight characteristic(s) is (are) to be fed to and displayed by the desired display device, one or more switches to control numerical data to be fed to and displayed by the desired display device, and in the case of multiple displays, a holding circuit which assures that data already being displayed by a given screen is not cut off that screen when the second screen is fed data for display. Thus, both screens can display flight characteristics and numerical data supplied by the single control knob and the single one or set of numeral switches. No processor is needed. The circuitry is simple and direct. The pilot and/or copilot can remotely change (via the control panel) the display in one or both screens, all with one hand and without looking at the control panel. Various other features of the improved visual display system of the present invention are set forth in the following detailed description and accompanying drawings.

BRIEF DESCRIPTION OF THE DRAWINGS

FIG. 1 is a schematic perspective view of a preferred embodiment of the improved visual display system of the present invention.

DETAILED DESCRIPTION OF THE PREFERRRED EMBODIMENT

Figure 2A:
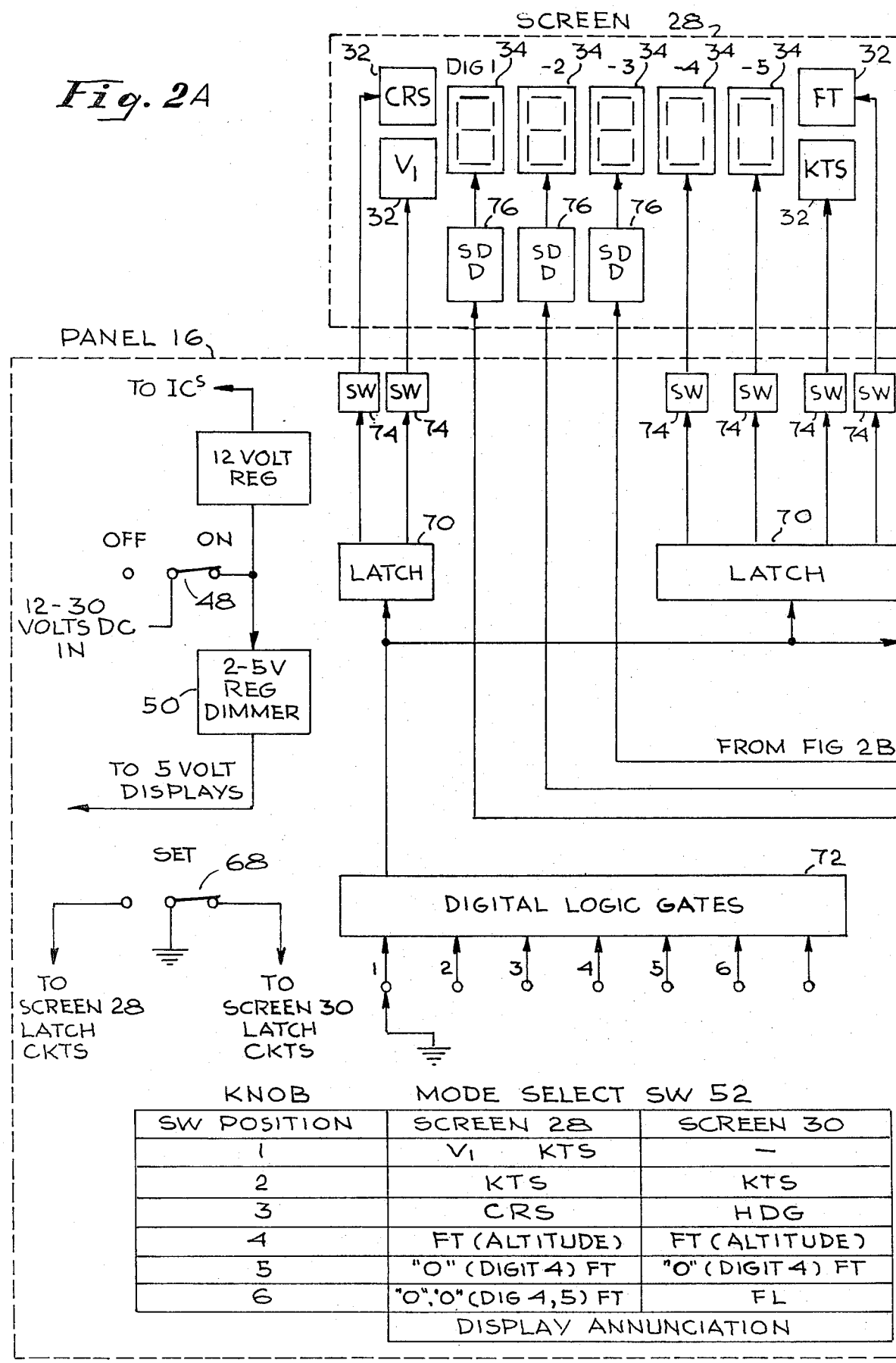
FIGS. 2A and 2B are a schematic block diagram showing the general layout of components and circuitry of the display system of FIG. 1.
Figure 2B:
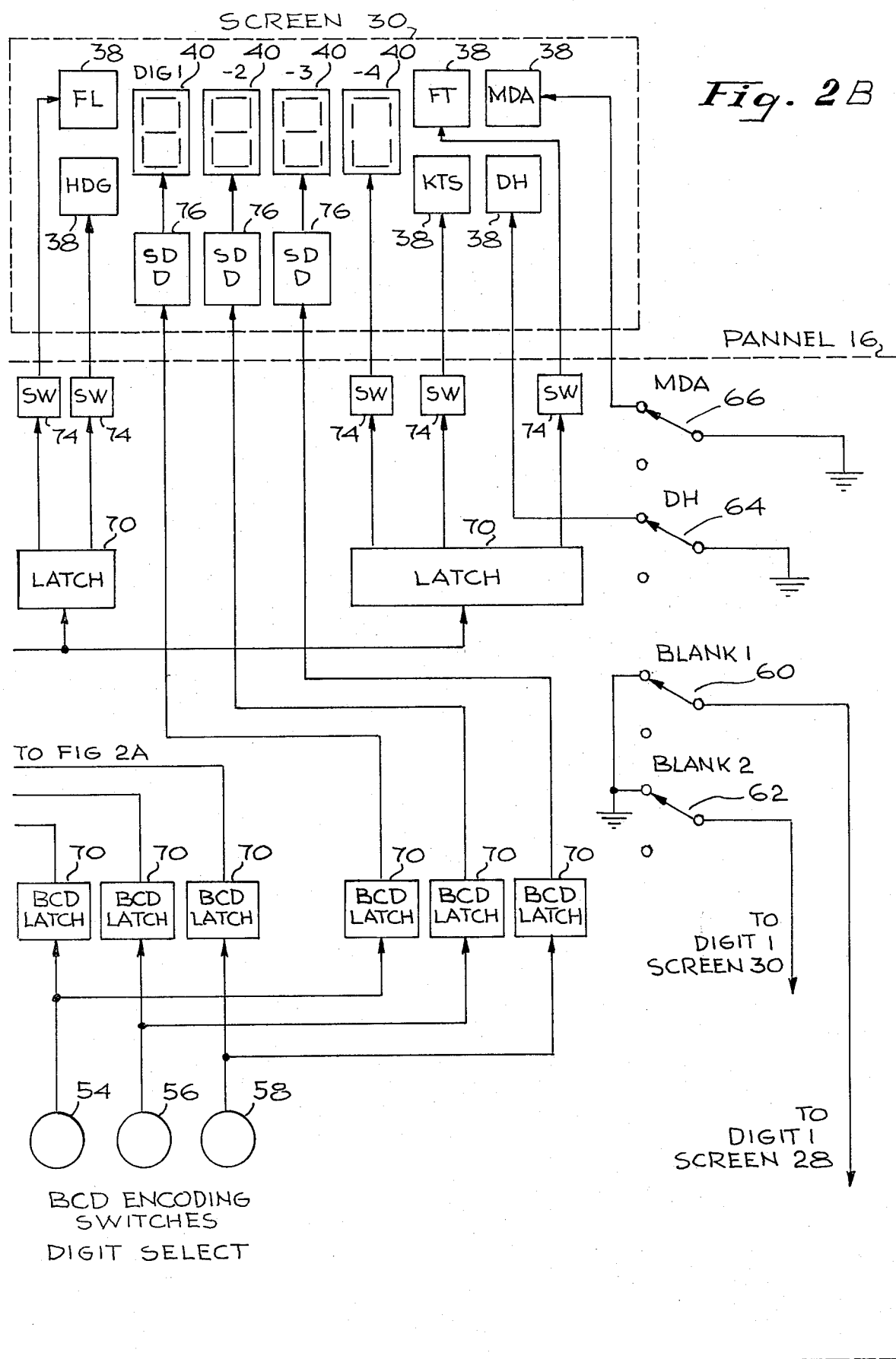

Now referring more particularly to FIGS. 1 and 2 of the drawings, a preferred embodiment of the improved visual display system for aircraft is schematically depicted therein. Thus, system 10 is shown which comprises a pair of visual display devices 12 and 14, a manually operable control panel 16 which may be remotely located relative to each of devices 12 and 14, and power means including an electrical power source (not shown), an electrical conduit 18 from that source to panel 16 and conduits 20 and 22 from panel 16 to devices 12 and 14, respectively.

It will be noted that devices 12 and 14 include hollow housings 24 and 26 secured to each other and having front viewing screens 28 and 30, respectively. Screen 28 has four lightable flight characteristic symbols 32, namely, CRS, $V_1$, FT and KTS, CRS meaning "course", $V_1$ meaning "Take-off decision speed", FT meaning "feet" and KTS meaning "knots", and each formed of, for example, light emitting diodes, a plurality of electric light bulbs or a back lighted cutaway or the like. Screen 28 also has 5 lightable digit display windows 34 wherein digits 36 can be displayed, as shown in FIG. 1. Screen 30 has 6 lightable flight characteristic symbols 38, FL, HDG, FT, KTS, MDA and DH meaning, respectively, "flight level", "heading", "feet", "knots", "minimum descent altitude" and "Decision height", and similar to symbols 34. In addition, screen 30 has 5 digit display windows 40 for displaying digits 42 therein.

Control panel 16 comprises a hollow housing 44 having a front control board 46 bearing power on-off switch 48, a dimmer control knob 50 for screens 28 and 30, a flight characteristic symbol control knob 52, three separate digit control knobs 54, 56 and 58, and push button switches 60, 62, 64, and 66, respectively, marked BL1, BL2, DH and MDA. Switches 60 and 62 are for turning off the first digit position or window 34 on screens 28 and 30, respectively. Switches 64 and 66 are for turning on and off the flight characteristic symbols for "decision height" and "minimum descent altitude" on screen 30. Control board 46 also includes a set switch 68 which regulates which of display devices 12 and 14 is to receive input from panel 16.

Electrical current passes through conduit 18 into housing 44 and out through conduits 20 and 22 to housings 24 and 26 when switch 48 is flipped to the "on" position to activate system 10. The block diagram of FIG. 2 shows schematically circuitry in housings 24, 26 and 44 and illustrates the operation of system 10. Thus, after switch 48 is flipped to the "on" position, and set switch 68 is flipped to the desired position to activate screen 28 or 30, knob 52 is rotated to the appropriate switch position, position 1 activating (lighting) the $V_1$ and KTS symbols in screen 28, position 2 activating the KTS symbol in either screen 28 or 30 (depending on the position of switch), position 3 activating the CRS symbol in screen 28 or the HDG symbol in screen 30, position 4 activating the FT symbol in either screen 28 or screen 30, position 5 activating the zero symbol in the fourth from the left digit window 34 or 40 and also the FT symbol and position 6 activating the zero symbol in both the fourth and fifth from the left windows 34 in screen 28, along with the FT symbol, or the symbol FL in screen 30.

After selecting the appropriate position for knob 52, and adjusting dimmer knob 50 to obtain the desired brightness on screen 28 or 30, digit knobs 54, 56 and 58 are rotated to the desired position to cause the appearance of the appropriate digit numerals in the first three (from the left) windows 34 or 40. If necessary, one or more switches 60, 62, 64 and/or 66 are pushed to respectively, cancel a zero symbol in the first (from the left) window 34 or 40, cause the lighting up of the DH symbol in screen 30 or cause the lighting up of the MDA symbol in screen 30.

System 10 includes "latch" means, which comprise conventionally constructed signal holding circuitry which prevents the cancellation of characteristic and digit symbol input, which is already being displayed in screens 28 and 30 when switch 68 is flipped to the opposite setting and the other of the two screens 28 and 30 is activated and passed input for immediate display. Thus, both screens 28 and 30 can be in the display mode at the same time. It will be noted, for example, that essentially all input to screens 28 and 30 is shown in FIG. 2 to pass through one or more latch means 70. Only the MDA, DH and zero cancellation symbol inputs to screen 30 and the zero cancellation input to screen 28 are not shown to pass through latch means 70. Input from switch 52 passes from digital logic gates 72 through one or more series connected latches 70 and through transistor switches 74. Each item of digital input from digit encoding switches 54, 56 and 58 passes through a latch 70 and a segment display driver 76.

A typical system 10 in operation has housings 24 and 26 mounted in full view of an aircraft pilot while control panel 16 is disposed nearby in the cockpit area for hand operation by the pilot or copilot. In a typical operation, for example, switch 48 is flipped on and set switch 68 is flipped, if necessary, to the screen 28 activation position shown in FIG. 1. Switch 48 may have a third position (not shown) for illuminating a light on control panel (board) 46 for night operation. Characteristic control knob 52 is then turned to the appropriate position, positions 1, 2, 3 and 4 being used for display screen 28 and positions 2, 3, 4, 5 and 6 for display screen 30 (see the display annunciation table in FIG. 2). A target take-off speed is entered on screen 28 by turning knob 52 to position 1. $V_1$ and KTS will light up in screen 28. The speed digits are then entered in screen 28 by turning knobs 54, 56 and 58 to the appropriate positions, for example to show a take-off target speed of 120 knots.

The pilot or copilot can also set the desired climb-out speed for display on screen 30 by flipping switch 68 to the screen 30 position. The latch circuits prevent loss of the take-off speed display from screen 28. Knob 52 is turned to position 2, lighting up the KTS symbol in screen 30. Digit select knobs 54, 56 and 58 are then turned to enter the display of the desired speed figures on screen 30.

Once the aircraft has taken off and there is no need for the take-off speed display, switch 68 is flipped to screen 28 position, leaving the display on in screen 30.

However, the display on screen 28 is now modified by turning knob 52 to, for example, display the symbol CRS (for desired navigational course) and by turning knobs 54, 56 and 58 to enter the desired digits in screen 28 in place of those originally displayed.

The desired cruising altitude can be entered on screen 30 by again flipping switch 68 to the screen 30 position, leaving the display an screen 28, while turning knob 52 to position 5 to display FT and also a zero in the fourth (from the left) window on screen 30 since this position is for mid-range altitude 1000–9990 ft.). Knobs 54, 56 and 58 are turned to cause the desired digits to be displayed on screen 30. If it is wished to substitute the maximum altitude for whatever is being displayed on screen 28, switch 68 is flipped to the proper position, and knob 52, is turned to position 6 and knobs 54, 56 and 58 are turned to the appropriate digit positions to cause the desired display. Zeroes automatically display in the fourth and fifth (from the left) windows of screen 28.

If it is desired to enter the flight level FL (ordinarily stated in 100's) on display screen 30, switch 68 is flipped to the screen 30 position, knob 52 is turned to position 61 which causes FL to display on screen 30, and knobs 54, 56 and 58 are turned to provide the desired digit display.

The DH symbol is used for "decision height" on precision approaches. Display of this symbol on screen 30 is accomplished by pressing off-on button 64 after setting switch 68 to the screen 30 position, turning knob 52 to the "low" position 4 (no zero) or medium position 5 (one zero) and the appropriate digits via knobs 54, 56 and 58. The symbol MDA for minimum descent altitude can be used in the same manner for display on screen 30. Only one of DH and MDA would be used at one time. Switches 60 and 62 are used to turn off the first digit position on screen 28 and 30, respectively, so as to permit display of a number less than 100.

Although the preferred embodiment disclosed utilizes a plurality of display screens, it is apparent that a simplified system can be employed which utilizes only a single display unit. In this instance, the control panel 16 would not have switch 68 thereon, nor need the signal holding circuitry and perhaps switches 64 and 66.

It will be understood that the improved visual display system for aircraft can embody various changes, modifications, alterations and additions in the components thereof, symbols and digits displayed, number, size and relative location of the display screens, the numbers, types of switches, holding circuits, etc. All such modifications, changes, alterations and additions as are within the scope of the appended claims form part of the present invention.

What is claimed is:

1. A visual display system for aircraft flight personnel, said system comprising, in combination:
   (a) a plurality of separate visual display devices;
   (b) a manually operable control panel connected to all of said display devices; and
   (c) power means connected to said display devices and said control panel, said control panel including:
      i. on-off switch means connected to said power means and said display devices; and
      ii. visual display input means, including:
         a. multi-position selector switch means, adapted to simultaneously activate both (1) a selected one of a plurality of legends relating to flight characteristics positioned on said display devices for display, and (2) circuit means for selectively allowing or preventing the display of a numeral in a display window on said display devices, b. multi-position numeral selector switch means to provide input of preselected numbers to said display devices for display, and c. visual display selector means to determine which of said display devices is provided with and displays said input.

2. The display system of claim 1, wherein said multi-position selector switch means comprises a single control knob.

3. The display system of claim 1 including holding means to retain visual display of input by one of said display devices while input is passed to and displayed by another of said display devices.

4. The display system of claim 1 wherein said circuit means is capable of selectively allowing or preventing the display of numerals in a plurality of display windows on said display devices.

5. A display system, said system comprising:

(a) a visual display device having a plurality of windows thereon adapted to display a plurality of digits, (b) a control panel connected to said display device; and (c) power means connected to said display device and said control device, said control panel including:

i. on-off switch means connected to said power means and said display device; and ii. visual display input means, including:

a. a selector switch means having a plurality of operating positions corresponding to a plurality of modes of operation, b. said selector switch means having circuit means connected thereto capable of selectively allowing or preventing the display device of a numeral in one or more of said windows, and c. multi-position numeral selector switch means to provide input of preselected numerals to the windows of said display device.

6. The display system of claim 5 wherein said selector switch means is a single multi-position switch.

* * * * *